United States Patent
Ochiai (10) Patent No.: US 6,727,676 B2
(45) Date of Patent: Apr. 27, 2004

(54) CONTROL DEVICE FOR HYBRID VEHICLE

(75) Inventor: Shinobu Ochiai, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/334,799

(22) Filed: Jan. 2, 2003

(65) Prior Publication Data

US 2003/0132730 A1 Jul. 17, 2003

(30) Foreign Application Priority Data

Jan. 16, 2002 (JP) ........................... 2002-008004

(51) Int. Cl.⁷ ............................... H01M 10/46
(52) U.S. Cl. ....................................... 320/104
(58) Field of Search ................. 320/104, 135, 320/134, 136, 150

(56) References Cited

U.S. PATENT DOCUMENTS

| | | | | |
|---|---|---|---|---|
| 4,962,462 A | * | 10/1990 | Fekete, deceased | 700/297 |
| 5,945,810 A | * | 8/1999 | Fujita et al. | 320/134 |
| 6,408,968 B1 | * | 6/2002 | Wakashiro et al. | 180/65.3 |
| 6,435,294 B1 | * | 8/2002 | Hara et al. | 180/65.4 |
| 6,557,655 B2 | * | 5/2003 | Ovshinsky et al. | 180/65.3 |

* cited by examiner

Primary Examiner—Edward Tso
(74) Attorney, Agent, or Firm—Arent Fox PLLC

(57) ABSTRACT

A control device for a hybrid vehicle which measures the degree of over-discharge of a battery depending on the temperature of the battery, and which performs control for protecting the battery. The control device for a hybrid for a hybrid vehicle which comprises an engine outputting driving power therefor, a motor connected to the engine and outputting auxiliary driving power for assisting the output of the engine, a battery supplying electrical power to the motor as well as storing electrical energy generated by the operation of the motor as a generator, and electrical loads being supplied energy generated from the motor and electrical energy from the battery, the control device comprising: a battery protection section for increasing the revolution rate of the engine or for stopping electrical supply to the electrical loads when it is determined that the battery is in an over-discharged state; a state of charge measuring section for measuring the state of charge of the battery; and a temperature measuring section for measuring the temperature of the battery, wherein the battery protection section increases the revolution rate of the engine in an idling mode when the state of charge of the battery is equal to or less than a first predetermined value which is determined depending on the temperature of the battery, and the battery protection section stops supplying electrical power to the electrical loads when the state of charge of the battery is equal to or less than a second predetermined value which is determined depending on the temperature of the battery.

8 Claims, 7 Drawing Sheets

CONTROL DEVICE FOR HYBRID VEHICLE

BACKGROUND OF THE INVENTION

1. Field of the Invention

The present invention relates to a control device for controlling the amount of charging or discharging of a battery installed in a hybrid vehicle in order to protect the battery.

2. Description of the Related Art

A hybrid vehicle, which comprises not only an engine but also an electric motor as the drive source, has been known in the art. Such hybrid vehicles are classified into two types: series hybrid vehicles and parallel hybrid vehicles. A series hybrid vehicle is a vehicle in which a motor is operated using the electrical power output of a generator which is driven by an engine, and the motor drives the wheels of the vehicle.

Accordingly, the engine and the wheels are not mechanically connected to each other; therefore, the engine can be continuously operated at a predetermined revolution rate at which high fuel efficiency and low emissions can be achieved.

In contrast, in the case of a parallel hybrid vehicle, driving operation by the drive shaft of an engine is assisted by a motor connected to the engine. The motor is also used as a generator, and the generated electrical energy is not only stored in a battery device but is also used for electrical equipment installed in the vehicle.

Accordingly, the load applied to the engine is reduced; therefore, as in the case of a series hybrid vehicle, better fuel efficiency and lower emissions can be achieved when compared with a conventional vehicle having only an engine.

As examples of the aforementioned parallel hybrid vehicles, a hybrid vehicle has been known in which a motor is directly connected to the output shaft of an engine so that the motor assists the output power of the engine, and the motor functions as a generator during deceleration, the output of the generator being stored in a battery or the like, and another hybrid vehicle has also been known in which one of an engine and a motor outputs driving power or both an engine and a motor output driving power, and a generator is provided separately.

In such hybrid vehicles, for example, the power of the engine is assisted using the electric motor during acceleration, whereas during deceleration, the battery or the like is charged using a deceleration regenerative operation. According to various control operations including the above, the electrical energy of the battery (hereinafter referred to as state of charge) is maintained while also satisfying the driver's demands.

When electrical power required by electrical equipment installed in a hybrid vehicle exceeds electrical power generated by the motor, the battery used in the hybrid vehicle supplies electrical power to the electrical equipment to make up for the shortfall. Accordingly, when the engine is in an idling mode, the electrical power consumed by the electrical equipment tends to exceed electrical power generated by the motor; as a result, a problem is encountered in that the battery tends to be in an over-discharged state. When the battery of the hybrid vehicle is in an over-discharged state, the vehicle must be driven solely by the engine; as a result, a problem is experienced in that fuel efficiency is degraded, or drive power is decreased. Furthermore, because hybrid vehicles may be used year-round, and also because hybrid vehicles may be used in cold areas, the vehicles may be subjected to a wide range of temperature variation, and in general, the output voltage of a battery tends to fall at low temperature, another problem is encountered in that the battery deteriorates and the operational life thereof may be shortened if the battery is continuously used in a manner as it would be at under normal temperatures.

SUMMARY OF THE INVENTION

In consideration of the above circumstances, an object of the present invention is to provide a control device for a hybrid vehicle, which measures the degree of over-discharge of a battery depending on the temperature of the battery, and which controls the amount of charge/discharge in accordance with the measured degree of over-discharge so as to protect the battery.

In order to solve the above problems and to achieve the above object, the present invention provides a control device for a hybrid vehicle which comprises an engine outputting driving power therefor, a motor connected to the engine and outputting auxiliary driving power for assisting the output of the engine, a battery supplying electrical power to the motor as well as storing electrical energy generated by the operation of the motor as a generator, and electrical loads being supplied energy generated from the motor and electrical energy from the battery, the control device comprising: a battery protection section for increasing the revolution rate of the engine or for stopping electrical supply to the electrical loads when it is determined that the battery is in an over-discharged state; a state of charge measuring section for measuring the state of charge of the battery; and a temperature measuring section for measuring the temperature of the battery, wherein the battery protection section increases the revolution rate of the engine in an idling mode when the state of charge of the battery is equal to or less than a first predetermined value which is determined depending on the temperature of the battery measured by the temperature measuring section, and the battery protection section stops supplying electrical power to the electrical loads when the state of charge of the battery is equal to or less than a second predetermined value which is determined depending on the temperature of the battery measured by the temperature measuring section.

According to the above control device of the present invention, because a module included in the battery is provided with a temperature sensor, and a threshold for determining whether the battery is in an over-discharged state is changed depending on the temperature of the battery measured by the battery sensor so that it is determined that the battery is in an over-discharged state at an earlier stage when the temperature of the battery is relatively low than when the temperature is moderate, an effect is obtained that a decrease in battery voltage when the battery is in an over-discharged state, which tends to occur under low temperature conditions, can be preferably prevented beforehand, and consequently, deterioration of the battery is delayed.

In the above control device of the present invention, supplying electrical power to the electrical loads may be stopped by disconnecting electrical connection to a converter which is provided in an electrical power supply path connecting the battery with the electrical loads.

Accordingly, because the electrical connection to the converter is disconnected when supplying electrical power to the electrical loads should be stopped, an effect is obtained that the electrical power supply can be simply stopped.

In the above control device of the present invention, the hybrid vehicle may further comprise a sub-battery for supplying electrical power to the electrical loads, and the converter may be provided in an electrical power supply path connecting the battery with the sub-battery.

Accordingly, an effect is obtained that the electrical power supply to the electrical loads can be continued even when the electrical connection to the converter is disconnected.

In the above control device of the present invention, the second predetermined value may be set to be smaller than the first predetermined value.

Accordingly, because the second predetermined value as the threshold for the state of charge is set to be smaller than the first predetermined value, an effect is obtained that the battery can be stepwise prevented from being in an overdischarged state as the state of charge decreases.

The present invention provides another control device for a hybrid vehicle which comprises an engine outputting driving power for the vehicle, a motor connected to the engine and outputting auxiliary driving power for assisting the output of the engine, a battery supplying electrical power to the motor as well as storing electrical energy generated by the operation of the motor as a generator, electrical loads being supplied energy generated from the motor and electrical energy from the battery, and a converter provided in an electrical power supply path connecting the battery with the electrical loads, the control device comprising: an engine stop section for stopping or starting the engine automatically depending on a predetermined operation state; and a battery protection section for stopping electrical power supply to the electrical loads when the engine is in an idling mode and when it is determined that the battery is in an overdischarged state, and for disconnecting electrical connection to the converter provided in the electrical power supply path connecting the battery with the electrical loads when the engine is in an automatically stopped state and when the state of charge of the battery is equal to or less than a first predetermined value.

According to the above control device of the present invention, because the electrical power supply to the electrical loads is stopped when the engine is in an idling mode and when it is determined that the battery is in an overdischarged state, the entire generated power can be used for charging. In addition, because the electrical connection to the converter provided in the electrical power supply path connecting the battery with the electrical loads is disconnected when the engine is in an automatically stopped state and when the state of charge of the battery is equal to or less than the first predetermined value, an effect is obtained that further discharge from the battery can be prevented.

In the above control device of the present invention, the vehicle may further comprise a contactor for connecting or disconnecting electrical power supply from the battery to the motor, and the battery protection section may disconnect the contactor when the engine is in an automatically stopped state and when the state of charge of the battery is equal to or less than a second predetermined value.

Accordingly, because the contactor is disconnected when the engine is in an automatically stopped state and when the state of charge of the battery is equal to or less than the second predetermined value, an effect is obtained that discharge from the battery can be completely stopped.

In the above control device of the present invention, the second predetermined value may be the lowest state of charge with which restarting of the engine is possible.

Accordingly, because the second predetermined value is set to be the lowest state of charge with which restarting of the engine is possible, an effect is obtained that the engine can be reliably restarted when the conditions for restarting of the engine are satisfied.

In the above control device of the present invention, the second predetermined value may be set to be smaller than the first predetermined value.

Accordingly, because the second predetermined value as the threshold for the state of charge is set to be smaller than the first predetermined value, an effect is obtained that the battery can be stepwise prevented from being in an overdischarged state as the state of charge decreases.

DETAILED DESCRIPTION OF THE PREFERRED EMBODIMENTS

An embodiment of the control device according to the present invention will be explained below with reference to the appended drawings.

Figure 1:
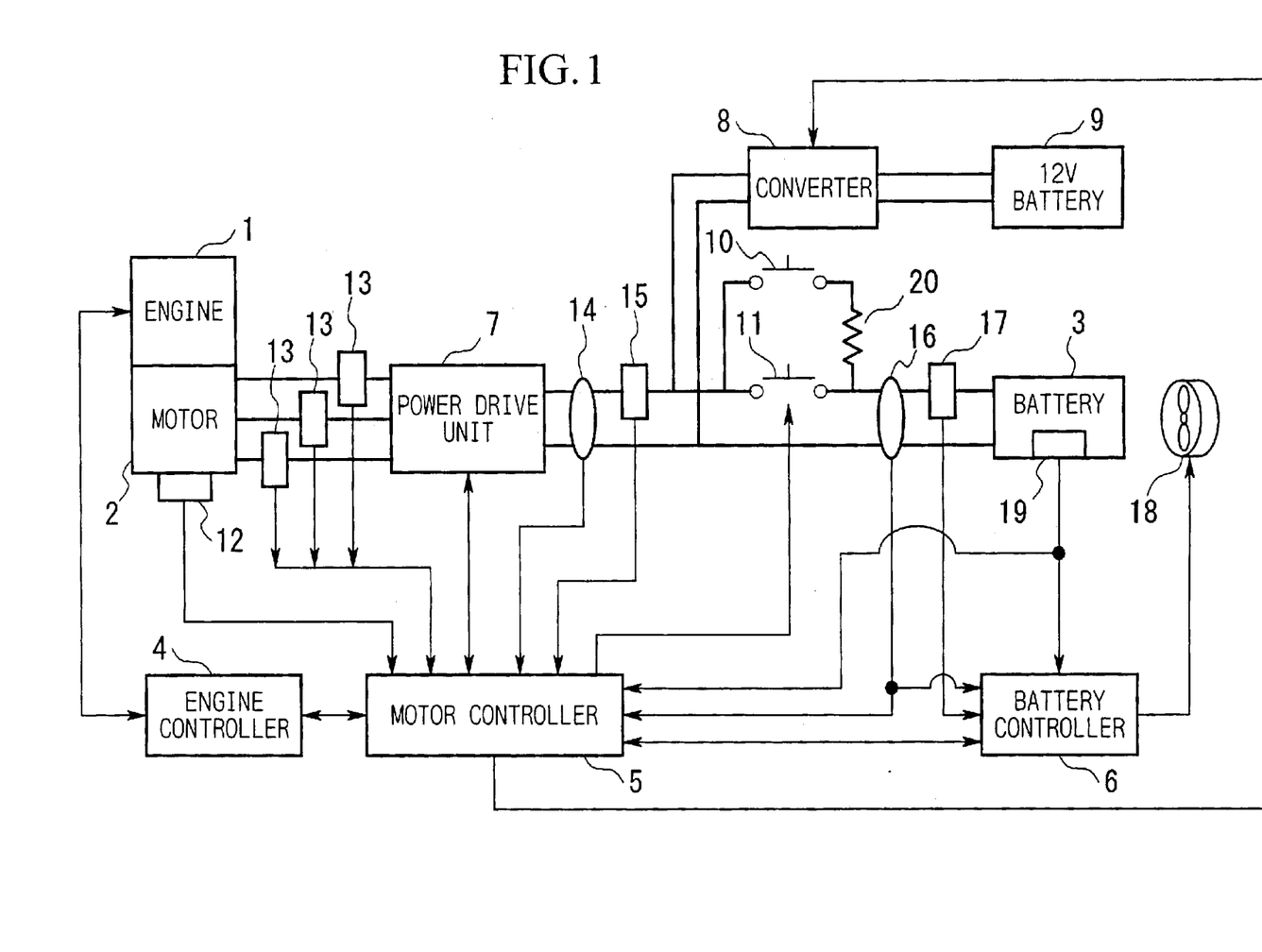
FIG. 1 is a block diagram showing the general structure of a control device of a hybrid vehicle having a control device for a hybrid vehicle in an embodiment according to the present invention.

FIG. 1 is a block diagram showing the general structure of a parallel hybrid vehicle, which is a type of hybrid vehicle, in an embodiment according to the present invention. In FIG. 1, reference symbol 1 indicates an engine which is operable by utilizing the combustive energy of fuel, reference symbol 2 indicates a motor which is operable by utilizing electrical energy and is used with the engine 1. The driving power of both the engine 1 and motor 2 is transmitted to drive wheels (not shown) via a transmission (not shown) comprising an automatic transmission or a manual transmission. When the hybrid vehicle decelerates, driving power is transmitted from the drive wheels to the motor 2, and the motor 2 functions as a generator so as to recover the kinetic energy of the vehicle as electrical energy.

Reference symbol 3 indicates a battery which supplies electrical power to the motor 2 as well as stores electrical energy generated by using the motor 2 as a generator when the motor 2 need not output driving power. The battery 3 is constructed as a high voltage battery which, for example, comprises a plurality of modules connected in series, each of which as a unit comprises a plurality of cells connected in series. For example, the battery 3 outputs a voltage of 144 volts comprising 120 unit batteries connected in series, each of which outputs a voltage of 1.2 volts. In addition, the module forming the battery 3 is provided with a temperature sensor 19.

Reference symbol 4 indicates an engine controller which monitors such as an engine revolution rate, and a vehicle speed at a predetermined interval, and which makes determination for operation mode such as a motor regeneration mode, an assist mode, and a deceleration mode based on the monitored values. The engine controller 4 also makes determination for the amount of assist or regeneration, and transmits information such as the operation mode, and the amount of assist or regeneration to a motor controller 5. When the motor controller 5 receives the above information, the motor controller 5 controls a power drive unit 7 which makes the motor 2 operate in a drive or regeneration operation in accordance with operation commands.

Reference symbol 6 indicates a battery controller which calculates the state of charge of the battery 3. Note that, in the following description, the state of charge is expressed in percentage with respect to a fully charged state of the battery. The battery controller 6 controls a cooling fan 18 provided in a battery box which accommodates the battery 3 so that the temperature of the modules forming the battery 3 is maintained to be lower than a predetermined value while referring to the output of the temperature sensor 19.

The engine controller 4, motor controller 5, and battery controller 6 each comprise a CPU (central processing unit) and a memory, and function by executing respective programs for performing the control operations.

Reference symbol 7 indicates a power drive unit which comprises three units connected to each other in parallel, each of which comprises two switching elements connected to each other in series. The switching elements in the power drive unit 7 is turned on or off by the motor controller 5, whereby DC component in the high voltage system supplied from the battery 3 to power drive unit 7 is supplied to the motor 2 via three-phase wires.

Reference symbol 9 indicates a 12-volt battery which operates several types of auxiliary equipment. The 12-volt battery is connected to the battery 3 via a converter 8. The converter 8 supplies electrical power to the 12-volt battery from the battery 3 after decreasing the voltage.

Reference symbol 10 indicates a pre-charge contactor, and reference symbol 11 indicates a main contactor. The battery 3 is connected with the power drive unit 7 via the pre-charge contactor 10 and main contactor 11. The pre-charge contactor 10 and main contactor 11 are turned on or off by the motor controller 5 in a controlled manner.

Reference symbol 12 indicates a sensor which measures the rotational position and revolution rate of the motor 2, and reference symbol 13 indicates an electrical current sensor which measures electrical current in the three-phase wires. The measured values measured by the sensors 12 and 13 are input to the motor controller 5.

Reference symbol 14 indicates a voltage sensor which measures the voltage at the input section of the power drive unit 7. Reference symbol 15 indicates an electrical current sensor which measures electrical current input to the power drive unit 7. Reference symbol 16 indicates a voltage sensor which measures the voltage at the side of the battery 3. The measured voltage measured by the voltage sensors 14 and 16 and the measured current measured by the current sensor 15 are input to the motor controller 5.

Reference symbol 17 indicates an electrical current sensor which is provided near the battery 3, and which measures electrical current flowing in the side of the battery 3 via the contactor.

As mentioned above, the sensors 14 to 16 measure voltage and electrical current in the side of the battery 3 via the contactors 10 and 11, and measure voltage and electrical current in the side of the power drive unit 7 via the contactors. The electrical current measured by the current sensor 15 is decreased compared with the current flowing from the battery 3 to the power drive unit 7 by the amount of the current flowing through the converter 8.

Next, the operations of the above controllers for a hybrid vehicle will be briefly explained below.

First, the battery controller 6 calculates the state of charge based on the input/output electrical current, voltage, temperature, and the like at the side of the battery 3, and inputs the value of the state of charge to the motor controller 5. The motor controller 5 inputs the value of the state of charge to the engine controller 4. The engine controller 4 determines operation mode (e.g., assist mode, regeneration mode, starting mode, deceleration mode, idling mode, etc.) and demanded electrical power for the motor 2 based on the state of charge, engine revolution rate, opening degree of throttle, engine torque, actual torque of the motor, etc., and inputs signals of the operation mode and demanded power to the motor controller 5.

When the vehicle is operated in the assist mode or deceleration mode, the motor controller 5, upon receiving signals of the operation mode and demanded power from the engine controller 4, executes a feedback control so that the electrical power at the input side of the power drive unit 7 (measured by the voltage sensor 14 and current sensor 15 shown in FIG. 1) coincides with the demanded power received from the engine controller 4. On the other hand, when the vehicle is operated in a cruise mode, the motor controller 5 executes a feedback control so that the electrical power at the side of the battery 3 (measured by the voltage sensor 16 and current sensor 17 shown in FIG. 1) coincides with the demanded power. When the demanded power is thus calculated, the motor controller 5 controls the power drive unit 7 in accordance with the calculated power.

Next, the motor controller 5, upon receiving the signal of actual power from the power drive unit 7, inputs the signal of an actual torque calculated using the value of the actual power to the engine controller 4.

The engine controller 4, motor controller 5, and battery controller 6 controls the engine 1, motor 2, and battery 3 so as to drive the hybrid vehicle by executing the aforementioned operations at a predetermined interval.

Figure 2:
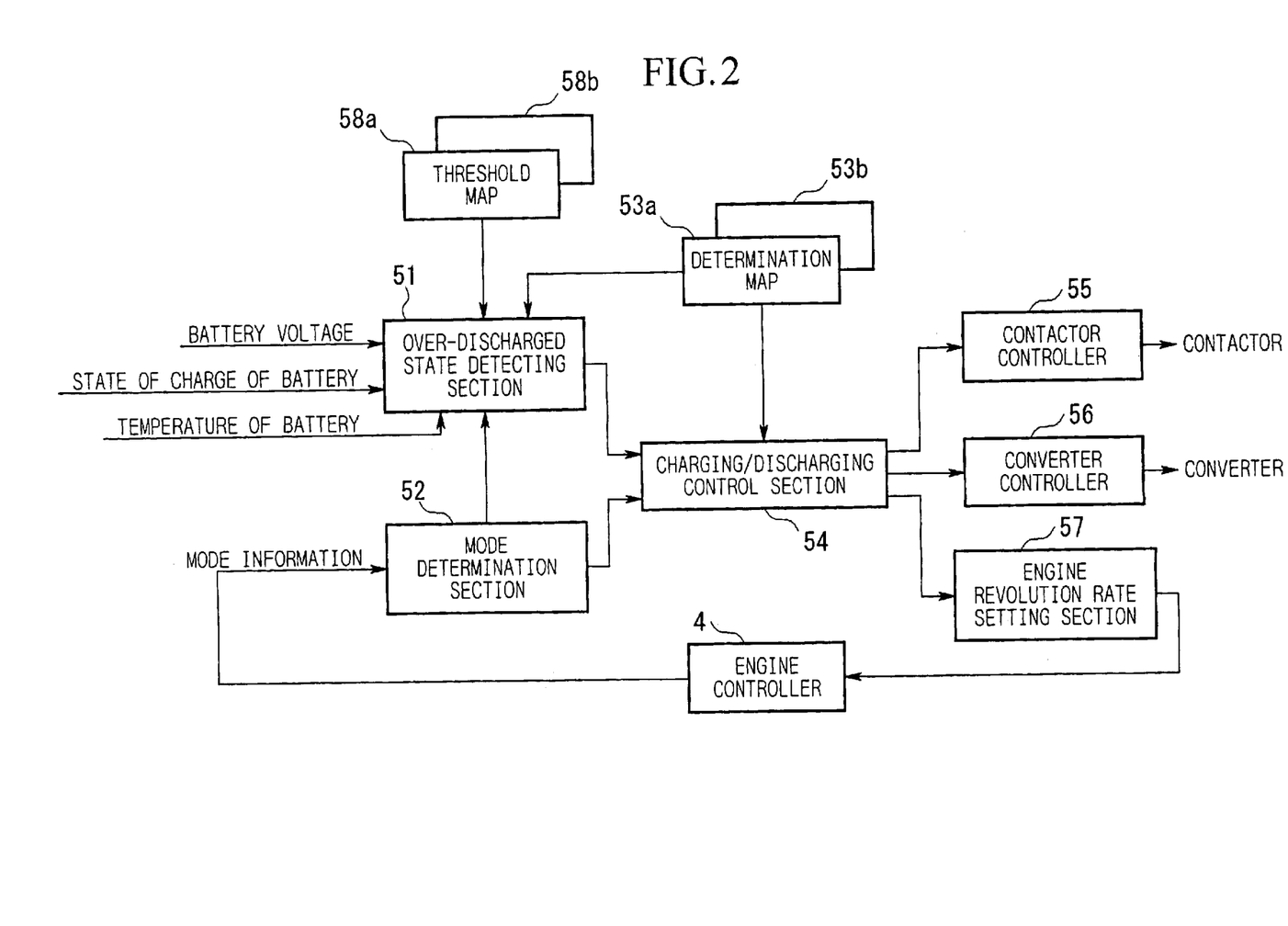
FIG. 2 is a block diagram showing the general structure of a control device for a hybrid vehicle.

Next, the control device of the present invention will be explained below with reference to FIG. 2. In FIG. 2, reference symbol 51 indicates an over-discharged state detecting section which determines whether or not the battery 3 is in an over-discharged state based on the voltage and state of charge of the battery 3. Reference symbol 52 indicates a mode determining section which determines the current operation mode of the hybrid vehicle based on a mode information output from the engine controller 4. Reference symbol 53*a* indicates a determination map in which measures are defined that are to be taken for the battery 3 when the battery 3 is in an over-discharged state while the vehicle is in an idling mode. Reference symbol 53*b* indicates another determination map in which measures are defined that are to be taken for the battery 3 when the battery 3 is in an over-discharged state while the vehicle is in an idling stopped mode.

Reference symbol 58*a* indicates a threshold map in which thresholds are defined that are used to read the determination map in which measures are defined that are to be taken for the battery 3 when the battery 3 is in the over-discharged state while the vehicle is in the idling mode. Reference symbol 58b indicates another threshold map in which thresholds are defined that are used to read the determination map in which measures are defined that are to be taken for the battery 3 when the battery 3 is in the over-discharged state while the vehicle is in the idling stopped mode.

Reference symbol 54 indicates a charging/discharging control section which takes a measure to protect the battery 3 while referring to the determination maps 53a and 53b. Reference symbol 55 indicates a contactor control section which turns on or off the main contactor 11 in a controlled manner. Reference symbol 56 indicates a converter control section which turns on or off the converter 8 in a controlled manner. Reference symbol 57 indicates an engine revolution rate setting section which outputs command to the engine controller 4 for increasing an idling revolution rate of the engine 1 or for restarting the engine 1.

Note that the over-discharged state detecting section 51, mode determining section 52, determination maps 53a and 53b, threshold maps 58a and 58b, charging/discharging control section 54, contactor control section 55, converter control section 56, and engine revolution rate setting section 57 shown in FIG. 2 are practically provided in the motor controller 5 shown in FIG. 1.

Figure 3:
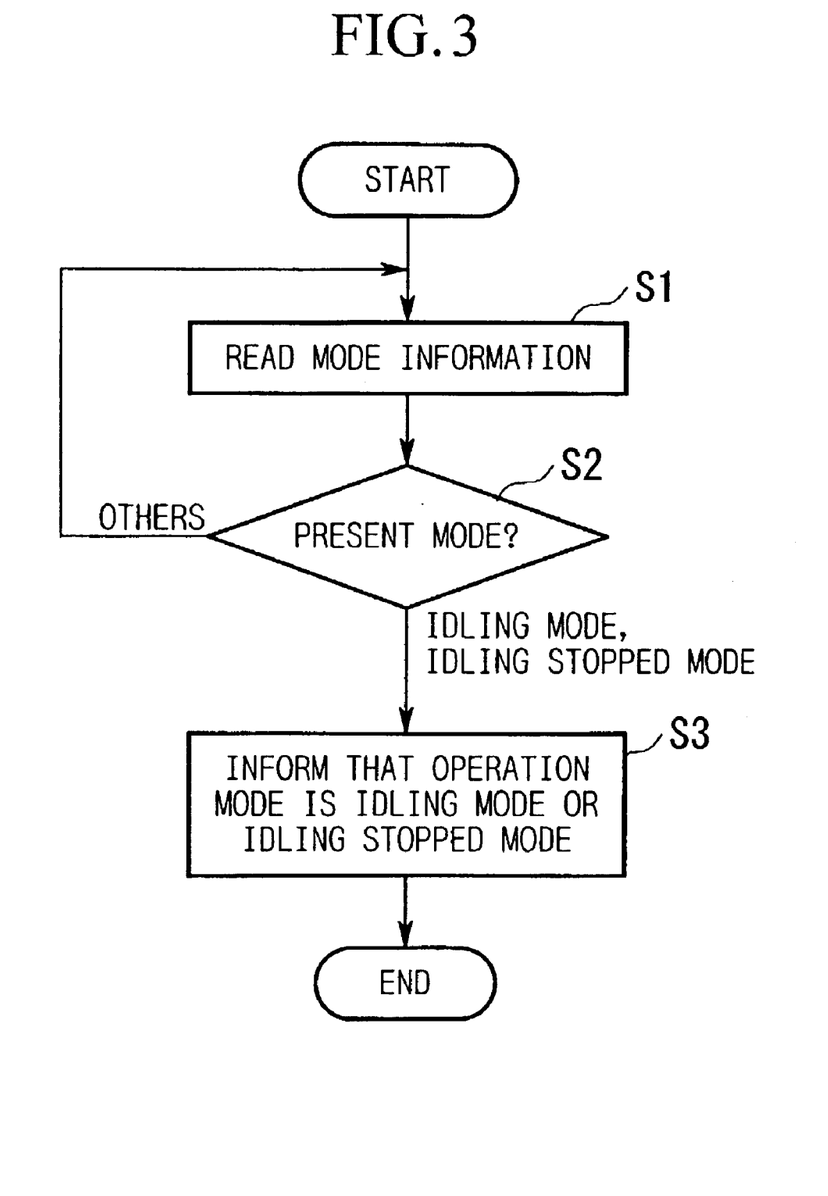
FIG. 3 is a flowchart showing the operation of a mode determination section 52 shown in FIG. 2.
Figure 4:
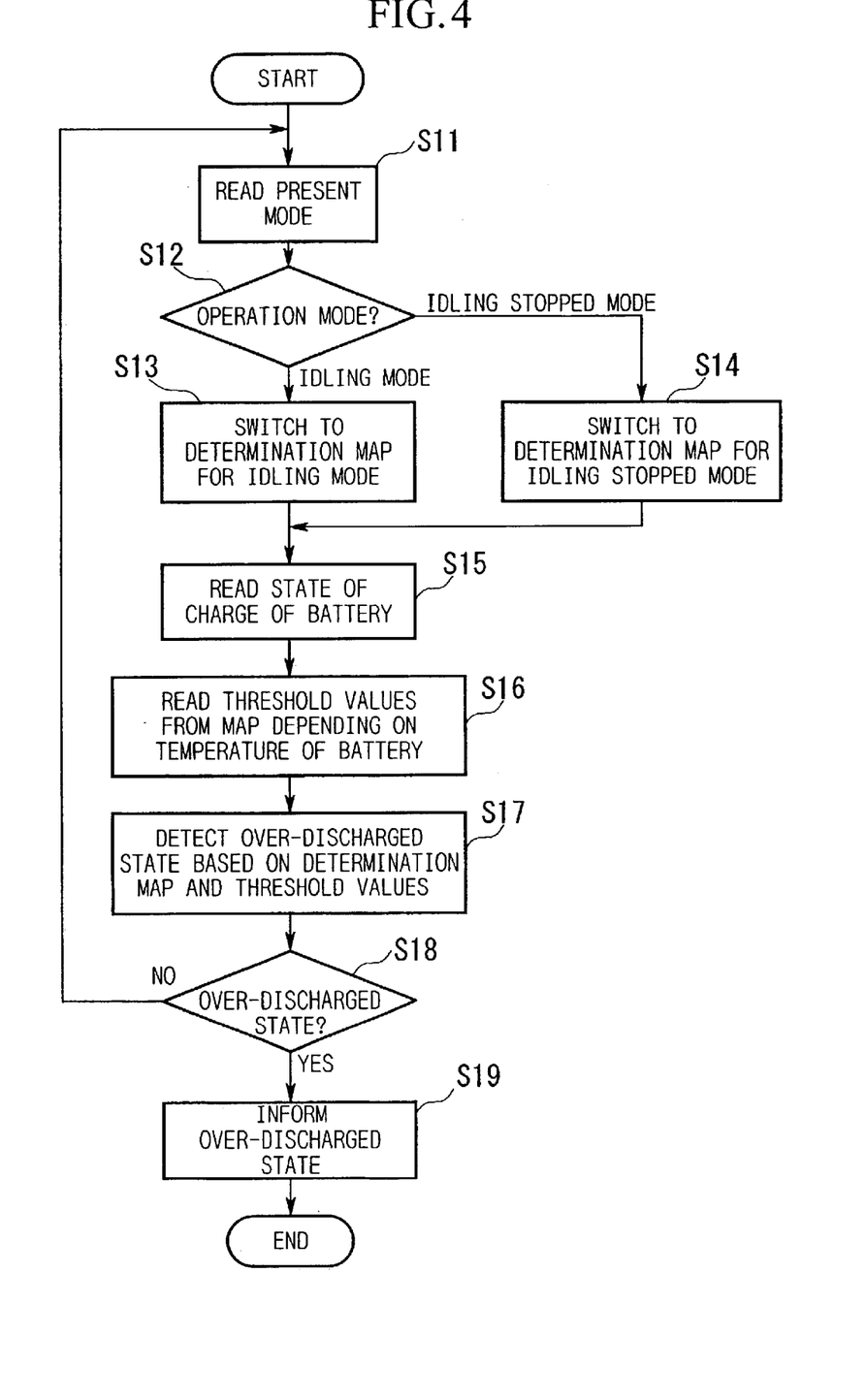
FIG. 4 is a flowchart showing the operation of an overdischarged state detecting section 51 shown in FIG. 2.
Figure 5:
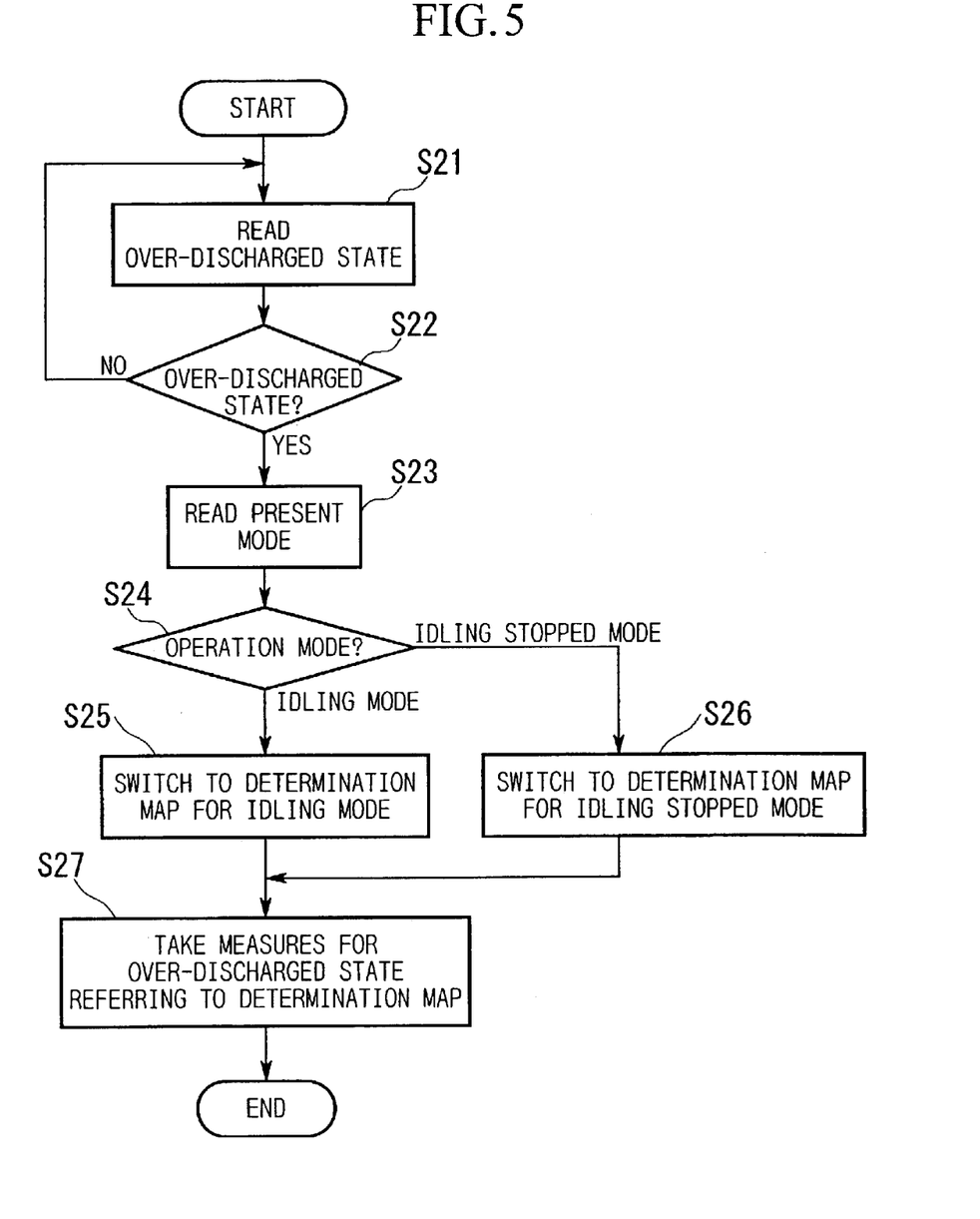
FIG. 5 is a flowchart showing the operation of a charging/discharging control section 54 shown in FIG. 2.
Figure 6:
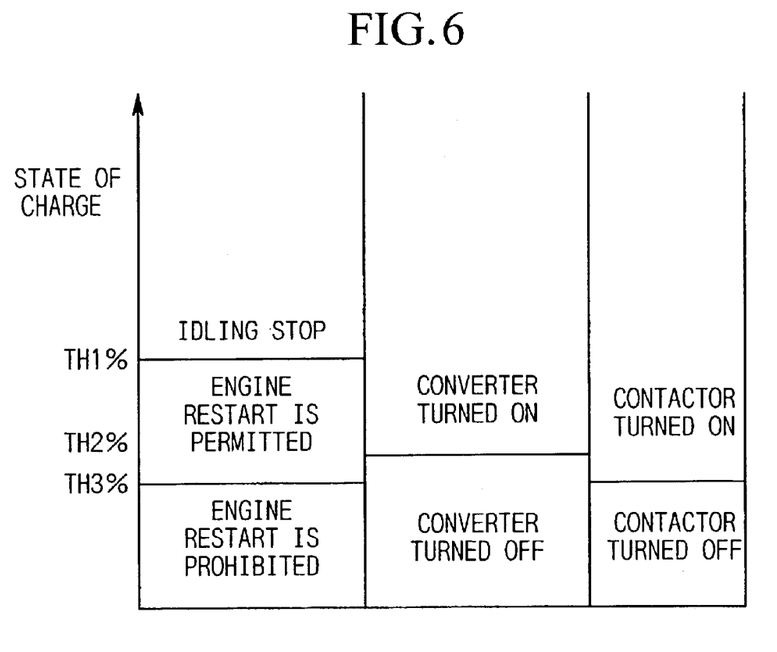
FIG. 6 is an explanatory diagram showing the constitution of a determination map 53a (for an idling stopped mode) shown in FIG. 2.
Figure 7:
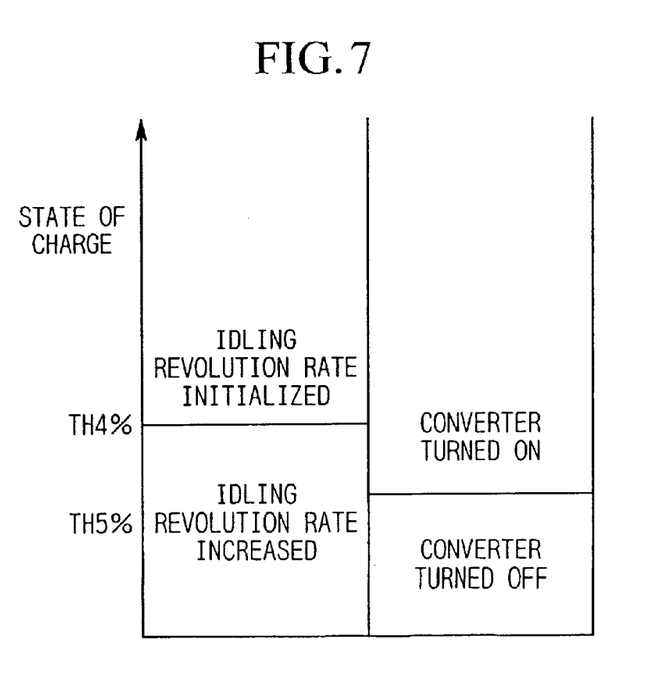
FIG. 7 is an explanatory diagram showing the constitution of a determination map 53b (for an idling mode) shown in FIG. 2.
Figure 8:
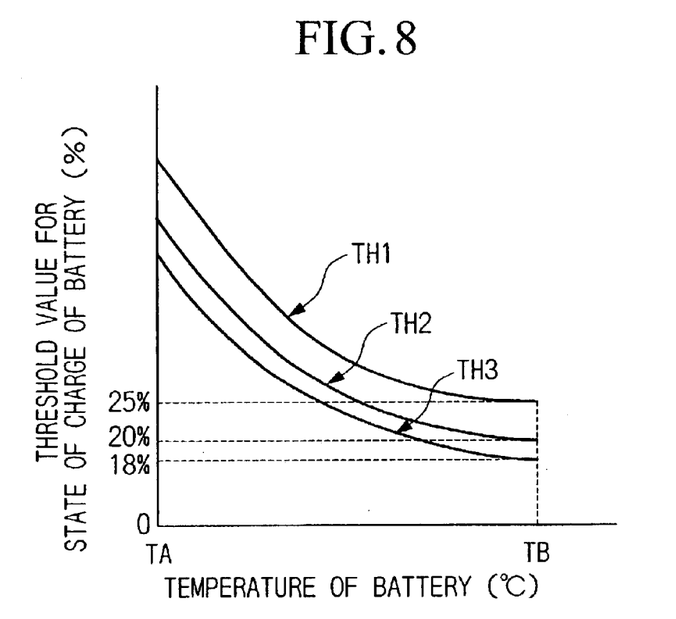
FIG. 8 is an explanatory diagram showing the constitution of a threshold map 58a (for the idling stopped mode) shown in FIG. 2.
Figure 9:
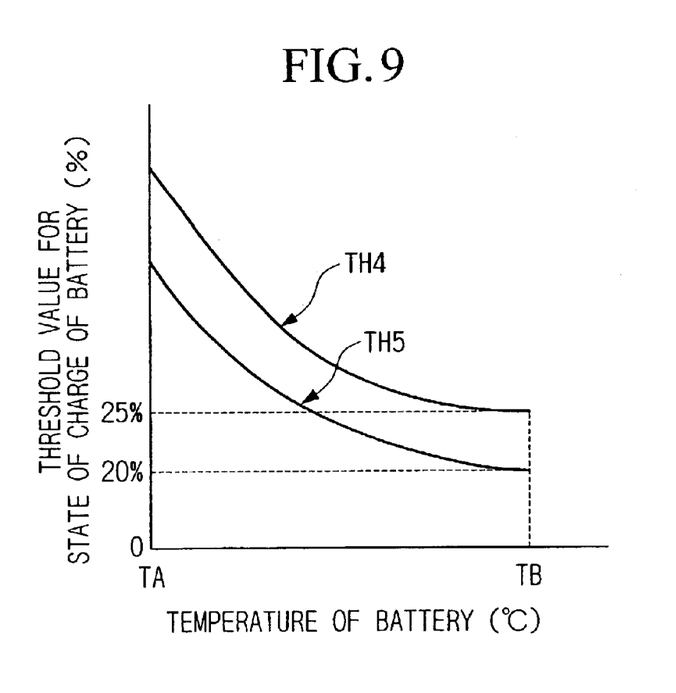
FIG. 9 is an explanatory diagram showing the constitution of a threshold map 58b (for the idling mode) shown in FIG. 2.

Next, the operation of the control device shown in FIG. 2 will be explained below with reference to FIGS. 3 to 9. FIG. 4 is a flowchart showing the operation of the over-discharged state detecting section 51 shown in FIG. 2. FIG. 5 is a flowchart showing the operation of the charging/discharging control section 54 shown in FIG. 2. FIGS. 6 and 7 are explanatory diagrams showing the constitutions of the determination maps 53a and 53b shown in FIG. 2. FIGS. 8 and 9 are explanatory diagrams showing the constitutions of the threshold maps 58a and 58b shown in FIG. 2.

First, the determination maps 53a and 53b and the threshold maps 58a and 58b will be explained with reference to FIGS. 6 to 9. FIG. 6 shows the determination map 53a, in which operations are defined depending on the state of charge, and which is referred to when the operation mode of the vehicle is in the idling stopped mode. In the present embodiment, the operation is defined so as to permit the restart of the engine 1 when the state of charge decreases to be less than the threshold value TH1 (%) defined in the threshold map 58a. In addition, the operation is also defined so as to turn off the converter 8 when the state of charge decreases to be less than the threshold value TH2 (%). Moreover, the operation is defined so as to turn off the main contactor 11, and so as to prohibit the restart of the engine 1 when the state of charge decreases to be less than the threshold value TH3 (%).

FIG. 8 shows the threshold map 58a in which the threshold values TH1, TH2, and TH3, which are to be used in the determination map 53a that is referred to when the operation mode of the vehicle is in the idling stopped mode, are defined depending on the temperature of the battery 3. The threshold values TH1, TH2, and TH3 are set so that the threshold values for the state of charge of the battery are decreased as the temperature of the battery 3 increases. A reference battery temperature TA is substantially the same value as the lowest temperature in the normal operation temperature range of the battery 3. A reference battery temperature TB is the temperature which can be maintained by cooling the battery 3 using a cooling fan 18, and which is substantially the same value as the highest temperature in the normal operation temperature range of the battery 3.

When the temperature of the battery is equal to the reference battery temperature TB, the threshold value TH1 is set to be 25%, the threshold value TH2 is set to be 20%, and the threshold value TH3 is set to be 18%. The threshold value TH3 is substantially the same value as the lowest state of charge at which the voltage of the battery which is required to restart the engine 1 can be obtained. Accordingly, when the temperature of the battery 3 is equal to the reference battery temperature TB, the restart of the engine 1 is permitted, and the engine 1 is restarted when the state of charge decreases to less than 25% (TH1). On the other hand, the converter 8 is turned off when the state of charge decreases to less than 20% (TH2). Moreover, the contactor 11 is turned off, and thus the restart of the engine 1 is prohibited when the state of charge decreases to less than 18% (TH3). In contrast, the threshold values TH1, TH2, and TH3 are increased as the temperature of the battery 3 decreases so as to be close to the reference battery temperature TA. As a result, restart of the engine 1, turning off of the converter 8, and turning off of the contactor 11 are executed at an earlier stage than in a case in which the temperature of the battery 3 is high. Note that the threshold value TH3 may be set to be, for example, 10%, which is the lowest possible state of charge for the battery 3 for discharging.

FIG. 7 shows the determination map 53b, in which operations are defined depending on the state of charge or the voltage of the battery 3, and which is referred to when the operation mode of the vehicle is in the idling mode. In the present embodiment, the operation is defined so as to increase idle revolution rate of the engine 1 when the state of charge decreases to be less than the threshold value TH4 (%) defined in the threshold map 58b. In addition, the operation is also defined so as to turn off the converter 8 when the state of charge decreases to be less than the threshold value TH5 (%).

FIG. 9 shows the threshold map 58b in which the threshold values TH4 and TH5, which are to be used in the determination map 53b that is referred to when the operation mode of the vehicle is in the idling mode, are defined depending on the temperature of the battery 3. The threshold values TH1, TH2, and TH3 are set so that the threshold values for the state of charge of the battery are decreased as the temperature of the battery 3 increases. A reference battery temperature TA is substantially the same value as the lowest temperature in the normal operation temperature range of the battery 3. The reference battery temperatures TA and TB are the same values as explained in FIG. 8, i.e., the reference battery temperatures TA is substantially the same value as the highest temperature in the normal operation temperature range of the battery 3, and the reference battery temperatures TB is substantially the same value as the lowest temperature in the normal operation temperature range.

When the vehicle is in the idling mode, and when the temperature of the battery is equal to the reference battery temperature TB, the threshold value TH4 is set to be 25%, the threshold value TH5 is set to be 20%. Accordingly, when the temperature of the battery 3 is equal to the reference battery temperature TB, the idle revolution rate of the engine 1 is increased when the state of charge decreases to less than 25% (TH4). On the other hand, the converter 8 is turned off when the state of charge decreases to less than 20% (TH5). In contrast, the threshold values TH4 and TH5 are increased as the temperature of the battery 3 decreases so as to be close to the reference battery temperature TA. As a result, restart of the engine 1, turning off of the converter 8, and turning off of the contactor 11 are executed at an earlier stage than in a case in which the temperature of the battery 3 is high.

Next, the mode determination operation of the mode determination section 52 will be explained with reference to FIG. 3.

First, the mode determination section 52 reads mode information output from the engine controller 4 (step S1). The operation modes of the hybrid vehicle include an assist mode, a regeneration mode, a starting mode, a deceleration mode, an idling mode, an idling stopped mode, etc. The idling mode is an operation mode in which the engine 1 runs at idling revolution rate. The idling stopped mode is an operation mode in which the engine 1 is stopped by stopping fuel supply to the engine 1 when predetermined conditions are satisfied during the idling mode. The engine controller 4 selects any one of the above-described operation modes in response to the driving conditions of the vehicle, and the engine controller 4 outputs the selected operation mode to the motor controller 5. Upon receiving the operation mode information, the motor controller 5 controls the motor 2 in response to the operation mode. Note that the operation mode information read by the motor controller 5 is the same as that provided by the engine control device 4 for controlling the motor 2.

Next, the mode determination section 52 determines which operation mode was read (step S2). When it is determined that the operation mode is the idling mode or the idling stopped mode, the operation proceeds to step S3, and when it is determined that the operation mode is other than the idling mode or the idling stopped mode, the operation returns to step S1.

When it is determined that the operation mode is the idling mode or the idling stopped mode in step S2, the result is provided to the over-discharged state detecting section 51 and to the charging/discharging control section 54 (step S3). At this time, the operation mode information is sent in a form such that it can be distinguished whether it is the idling mode or the idling stopped mode.

As described above, the mode determination section 52 provides the present operation mode to the over-discharged state detecting section 51 and to the charging/discharging control section 54 only when the revolution rate of the engine 1 is equal to or less than the idling revolution rate and when the operation mode is either the idling mode or the idling stopped mode in which the amount of generation by the motor becomes small. Note that the mode determination section 52 repeats the operations shown in FIG. 3.

Next, the operation of the over-discharged state detecting section 51 for detecting the over-discharged state of the battery 3 will be explained with reference to FIG. 4.

First, the over-discharged state detecting section 51 reads the present operation mode output from the mode determination section 52 (step S11). The operation mode read here is the idling mode or the idling stopped mode because the output of the mode determination section 52 is read.

Next, the over-discharged state detecting section 51 determines which operation mode was read (step S12). When it is determined that the operation mode is the idling mode, the determination map 53a and the threshold map 58a which correspond to the idling mode are selected (step S13). In contrast, when it is determined that the operation mode is the idling stopped mode, the determination map 53b and the threshold map 58b which correspond to the idling stopped mode are selected (step S14).

Next, the over-discharged state detecting section 51 reads the state of charge of the battery which is provided from the battery controller 6 (step S15). Subsequently, based on the present temperature of the battery 3, the over-discharged state detecting section 51 reads the threshold values (TH1, TH2, and TH3, or TH4 and TH5) corresponding to the present temperature of the battery 3 from the threshold map 58a or 58b (step S16). The output of the temperature sensor 19 installed on the module that forms the battery 3 is used as the temperature of the battery 3.

Next, the over-discharged state detecting section 51 detects the over-discharged state of the battery 3 (step S17) based on the threshold values (TH1, TH2, and TH3, or TH4 and TH5) read from the determination map 53a or 53b and the threshold map 58a or 58b, either of which is presently selected, and based on the state of charge having been read. The over-discharged state of the battery 3 is determined in such a way that the battery 3 is in the over-discharged state when the state of charge provided by the battery controller 6 is less than a predetermined value, i.e., when the state of charge is less than the threshold value T1 or TH4 when, for example, the temperature of the battery 3 is TB. In the examples shown in FIGS. 8 and 9, it is determined that the battery 3 is in the over-discharged state when the state of charge is less than 25%.

In step S18, it is determined whether the battery 3 is in the over-discharged state based on the detection result in step S17. When it is determined that the battery 3 is not in the over-discharged state, the operation returns to step S11, and the above-mentioned operations are repeated.

When it is determined in step S18 that the battery 3 is in the over-discharged state, the over-discharged state detecting section 51 provides information about the over-discharged state of the battery 3 to the charging/discharging control section 54 (step S19). The information provided here includes the present state of charge and the threshold values TH1, TH2, and TH3, or TH4 and TH5 which have been read from the threshold map 58a or 58b.

As described above, the over-discharged state detecting section 51 selects either of the determination map 53a and threshold map 58a which are referred to in the idling mode, or the determination map 53b and threshold map 58b which are referred to in the idling stopped mode, depending on whether the present operation mode is in the idling mode or idling stopped mode, and the over-discharged state detecting section 51 refers to the selected maps, detects the over-discharged state of the battery 3 in accordance with the temperature of the battery 3, and provides the detected state to the charging/discharging control section 54. Note that the over-discharged state detecting section 51 repeats the operations shown in FIG. 4.

Next, the operation of the charging/discharging control section 54 for protecting the battery 3 will be explained with reference to FIG. 5. The charging/discharging control section 54 repeats the operations shown in FIG. 5.

First, the charging/discharging control section 54 reads information, which may indicate the over-discharged state, output from the over-discharged state detecting section 51 (step S21). Next, the charging/discharging control section 54 determines whether the read information indicates the over-discharged state (step S22). When the result of the determination does not indicate the over-discharged state, the operation returns to step S21, and the charging/discharging control section 54 waits for information indicating over-discharged state.

In contrast, when the result of the determination indicates that the information output from the over-discharged state detecting section 51 indicates the over-discharged state, the charging/discharging control section 54 reads the present operation mode which is output from the mode determination section 52. Next, the charging/discharging control section 54 selects either the determination map 53a or the determination map 53b depending on the read present operation mode (steps S24, S25, and S26).

Next, the charging/discharging control section 54 takes measures for protecting the battery 3 (step S27) with reference to the threshold values TH1, TH2, and TH3, or TH4 and TH5 provided by the over-discharged state detecting section 51, and with reference to the determination map 53a or 53b which was selected in step S25 or S26. The measures taken for protecting the battery 3 are differently set depending on the current operation mode. When the vehicle is in the idling mode, and when the state of charge is equal to or less than the threshold value TH1 (%), the generation by the motor 2 is restarted by restarting the engine 1. This operation is executed by an engine restart command sent to the engine revolution rate setting section 57 from the charging/discharging control section 54. Upon receiving the engine restart command, the engine revolution rate setting section 57 sets an idling revolution rate, and sends a command for restarting engine to the engine controller 4. As a result, the generation by the motor 2 is resumed, and the generated electrical power is stored in the battery 3.

On the other hand, when the state of charge further decreases to be equal to or less than the threshold value TH2 (%), in addition to the restart of the engine 1, the converter 8 is turned off so that the electrical loads are disconnected from the battery 3. This operation is executed by a command for turning off the converter 8 sent to the converter control section 56 from the charging/discharging control section 54. Upon receiving the command for turning off the converter 8, the converter control section 56 outputs a signal for turning off the converter 8, and the converter 8 is turned off. Because the electrical power supply to the electrical equipment is stopped while the converter 8 is turned off, the electrical loads of the battery 3 is reduced.

Because the engine 1 can be restarted only when conditions for ensuring safety at engine restart are satisfied, for example, when the transmission is in a neutral state, and the clutch is disengaged, the engine 1 cannot be restarted when the clutch is continuously engaged by the operation of the operator. In such a case, the engine will not restart even when the engine restart command is sent. Consequently, when the state of charge further decreases to be equal to or less than the threshold value TH3 (%), the discharge of the battery 3 is completely stopped by turning off the main contactor 11. This operation is executed by a command for turning off the main contactor 11 sent to the contactor control section 55 from the charging/discharging control section 54. Upon receiving the command for turning off the main contactor 11, the contactor control section 55 outputs a signal for turning off the main contactor 11, and the main contactor 11 is turned off. As a result, because the discharge of the battery 3 is completely stopped, a further over-discharge of the battery 3 can be prevented.

Note that turning off of the main contactor 8 is executed only when the vehicle is in the idling stopped mode, and when the engine 1 cannot be restarted because when the state of charge decreases to be equal to or less than TH1 and the engine 1 is restarted, the operation mode is switched to idling mode, and the determination map 53b shown in FIG. 7 is selected to be referred to.

As explained above, when the vehicle is in the idling stopped mode, the over-discharge of the battery 3 can be prevented by executing the operations of "resuming generation by restart of the engine", "stopping electrical power supply to the electrical loads by turning off the converter", and "completely stopping discharge by disconnecting the electrical loads of the battery by turning off the contactor" stepwise as the state of charge decreases. Moreover, because the threshold value, which is used for determining timing to execute measures for protecting the battery, is changed depending on the temperature of the battery so that the over-discharged state is recognized at an earlier stage when the temperature of the battery is lower, falling of the output voltage of the battery which tends to occur at low temperature when the battery is over-discharged can be prevented, as a result, the deterioration of the battery can be delayed. Note that when the state of charge is recovered, the operations of "turning on the contactor", "turning on the converter", and "stopping idling" are executed stepwise.

On the other hand, when the vehicle is in the idling mode, and when the state of charge is equal to or less than the threshold value TH4 (%), the generation by the motor 2 is increased by increasing the idling revolution rate. This operation is executed by an idling revolution rate increasing command sent to the engine revolution rate setting section 57 from the charging/discharging control section 54. Upon receiving the idling revolution rate increasing command, the engine revolution rate setting section 57 sets an idling revolution rate, and sends this idling revolution rate to the engine controller 4. As a result, the shortfall of electrical power is supplemented by the increased amount of generation by the motor 2, as the engine revolution rate increases.

Furthermore, when the state of charge further decreases to be equal to or less than the threshold value TH5 (%), in addition to an increase in the idling revolution rate, the electrical loads of the battery 3 are disconnected by turning off the converter 8. This operation is executed by a command for turning off the converter 8 sent to the converter control section 56 from the charging/discharging control section 54. Upon receiving the command for turning off the converter 8, the converter control section 56 outputs a signal for turning off the converter 8, and the converter 8 is turned off. Although the electrical supply to the electrical equipment is stopped while the converter 8 is turned off, required electrical power is supplied from the 12-volt battery 9. As a result, the electrical loads of the battery 3 can be reduced. Note that because the main contactor 11 is turned on, electrical power generated by the motor 2 when the engine 1 runs in an idling state can be stored in the battery 3.

As explained above, when the vehicle is in the idling mode, the over-discharge of the battery 3 can be prevented by executing the operations of "increasing the amount of generation by increasing the idling revolution rate" and "stopping electrical power supply to the electrical loads by turning off the converter for supplying power to the electrical equipment" stepwise as the state of charge decreases. Moreover, because the threshold value, which is used for determining timing to execute measures for protecting the battery, is changed depending on the temperature of the battery so that the over-discharged state is recognized at an earlier stage when the temperature of the battery is lower, falling of the output voltage of the battery which tends to occur at low temperature when the battery is over-discharged can be prevented, as a result, the deterioration of the battery can be delayed. Note that when the state of charge is recovered, the operations of "turning on the contactor" and "initializing the idling revolution rate" are executed stepwise.

Note that, although, in the above description, the state of charge which is expressed by a ratio relative to the fully charged state of the battery is used for the control operation, the state of charge in FIGS. 6 to 9 may be substituted by the voltage of the battery because the state of charge can be calculated from the voltage of the battery.

As explained above, because the module included in the battery is provided with the temperature sensor, and the threshold value, which is used for determining timing to execute measures for protecting the battery, is changed depending on the temperature of the battery measured by the temperature sensor so that the over-discharged state is recognized at an earlier stage when the temperature of the battery is lower than when the temperature of the battery is in a normal range, falling of the output voltage of the battery, which tends to occur at low temperature when the battery is over-discharged, can be prevented, as a result, the deterioration of the battery can be delayed.

Advantageous Effects Obtained by the Invention

As explained above, according to the control device of present invention, because the module included in the battery is provided with the temperature sensor, and the threshold value, which is used for determining timing to execute measures for protecting the battery, is changed depending on the temperature of the battery measured by the temperature sensor so that the over-discharged state is recognized at an earlier stage when the temperature of the battery is lower than when the temperature of the battery is in a normal range, an effect is obtained that falling of the output voltage of the battery, which tends to occur at low temperature when the battery is over-discharged, can be prevented, and as a result, the deterioration of the battery can be delayed.

According to another control device of the present invention, because the electrical connection to the converter is disconnected when supplying electrical power to the electrical loads should be stopped, an effect is obtained that the electrical power supply can be simply and rapidly stopped.

According to another control device of the present invention, because a sub-battery for supplying electrical power to the electrical loads is provided, an effect is obtained that the electrical power supply to the electrical loads can be continued even when the electrical connection to the converter is disconnected.

According to another control device of the present invention, because the second predetermined value as the threshold for the state of charge is set to be smaller than the first predetermined value, an effect is obtained that the battery can be stepwise prevented from being in an over-discharged state as the state of charge decreases.

According to another control device of the present invention, because the electrical power supply to the electrical loads is stopped when the engine is in an idling mode and when it is determined that the battery is in an over-discharged state, the entire generated power can be used for charging. In addition, because the electrical connection to the converter provided in the electrical power supply path connecting the battery with the electrical loads is disconnected when the engine is in an automatically stopped state and when the state of charge of the battery is equal to or less than the first predetermined value, an effect is obtained that further discharge from the battery can be prevented.

According to another control device of the present invention, because the contactor is disconnected when the engine is in an automatically stopped state and when the state of charge of the battery is equal to or less than the second predetermined value, an effect is obtained that discharge from the battery can be completely stopped.

According to another control device of the present invention, because the second predetermined value is set to be the lowest state of charge with which restarting of the engine is possible, an effect is obtained that the engine can be reliably restarted when the conditions for restarting of the engine are satisfied.

What is claimed is:

1. A control device for a hybrid vehicle which comprises an engine outputting driving power therefor, a motor connected to said engine and outputting auxiliary driving power for assisting the output of said engine, a battery supplying electrical power to said motor as well as storing electrical energy generated by the operation of said motor as a generator, and electrical loads being supplied energy generated from said motor and electrical energy from said battery, the control device comprising:

a battery protection section for increasing the revolution rate of said engine or for stopping electrical supply to said electrical loads when it is determined that said battery is in an over-discharged state;

a state of charge measuring section for measuring the state of charge of said battery; and a temperature measuring section for measuring the temperature of said battery, wherein said battery protection section increases the revolution rate of said engine in an idling mode when the state of charge of said battery is equal to or less than a first predetermined value which is determined depending on the temperature of said battery measured by said temperature measuring section, and said battery protection section stops supplying electrical power to said electrical loads when the state of charge of said battery is equal to or less than a second predetermined value which is determined depending on the temperature of said battery measured by said temperature measuring section.

2. A control device as claimed in claim 1, wherein supplying electrical power to said electrical loads is stopped by disconnecting electrical connection to a converter which is provided in an electrical power supply path connecting said battery with said electrical loads.

3. A control device as claimed in claim 2, wherein said hybrid vehicle further comprises a sub-battery for supplying electrical power to said electrical loads, and said converter is provided in an electrical power supply path connecting said battery with said sub-battery.

4. A control device as claimed in claim 1, wherein said second predetermined value is set to be smaller than said first predetermined value.

5. A control device for a hybrid vehicle which comprises an engine outputting driving power for said vehicle, a motor connected to said engine and outputting auxiliary driving power for assisting the output of said engine, a battery supplying electrical power to said motor as well as storing electrical energy generated by the operation of said motor as a generator, electrical loads being supplied energy generated from said motor and electrical energy from said battery, and a converter provided in an electrical power supply path connecting said battery with said electrical loads, the control device comprising:

an engine stop section for stopping or starting said engine automatically depending on a predetermined operation state; and a battery protection section for stopping electrical power supply to said electrical loads when said engine is in an idling mode and when it is determined that said battery is in an over-discharged state, and for disconnecting electrical connection to said converter provided in said electrical power supply path connecting said battery with said electrical loads when said engine is in an automatically stopped state and when the state of charge of said battery is equal to or less than a first predetermined value.

6. A control device as claimed in claim 5, wherein said vehicle further comprises a contactor for connecting or disconnecting electrical power supply from said battery to said motor, wherein said battery protection section disconnects said contactor when said engine is in an automatically stopped state and when the state of charge of said battery is equal to or less than a second predetermined value.

7. A control device as claimed in claim 6, wherein said second predetermined value is the lowest state of charge with which restarting of said engine is possible.

8. A control device as claimed in claim 6, wherein said second predetermined value is set to be smaller than said first predetermined value.

\* \* \* \* \*